US009945462B2

(12) United States Patent
Vallebrant et al.

(10) Patent No.: US 9,945,462 B2
(45) Date of Patent: Apr. 17, 2018

(54) HYDROSTATIC ASSEMBLY

(71) Applicants: Parker Hannifin Corporation, Cleveland, OH (US); Kinetics Drive Solutions Inc., Langley, British Columbia (CA)

(72) Inventors: Per-Ola Vallebrant, Trollhaettan (SE); Stefan Haellgren, Trollhaettan (SE); John Czepak, Burnaby (CA); Gerald Dyck, Abbotsford (CA)

(73) Assignees: Parker-Hannifin Corporation, Cleveland, OH (US); Kinetics Drive Solutions Inc., Langley, British Columbia (GB)

( * ) Notice: Subject to any disclaimer, the term of this patent is extended or adjusted under 35 U.S.C. 154(b) by 286 days.

(21) Appl. No.: 14/902,681

(22) PCT Filed: Jul. 4, 2014

(86) PCT No.: PCT/IB2014/062866
§ 371 (c)(1),
(2) Date: Jan. 4, 2016

(87) PCT Pub. No.: WO2015/001529
PCT Pub. Date: Jan. 8, 2015

(65) Prior Publication Data
US 2016/0169357 A1    Jun. 16, 2016

Related U.S. Application Data

(60) Provisional application No. 61/843,316, filed on Jul. 5, 2013.

(51) Int. Cl.
*F16H 61/452*    (2010.01)
*F16H 39/10*    (2006.01)
(Continued)

(52) U.S. Cl.
CPC ............ *F16H 39/10* (2013.01); *F16H 61/423* (2013.01); *F16H 61/433* (2013.01); *F16H 61/44* (2013.01);
(Continued)

(58) Field of Classification Search
CPC ......... F16H 2039/105; F16H 2047/025; F16H 61/448; F16H 61/452
See application file for complete search history.

(56) References Cited

U.S. PATENT DOCUMENTS 3,052,098 A    9/1962    Heinrich
3,074,296 A *  1/1963    Heinrich ................. F16H 47/04
                                                   192/3.54
(Continued)

FOREIGN PATENT DOCUMENTS

DE          10 64 311 B      12/2004
DE     10 2008 002140 A1    12/2009

OTHER PUBLICATIONS

International Search Report and Written Opinion for corresponding patent application No. PCT/IB2014/062866 dated Dec. 1, 2014.

*Primary Examiner* — F. Daniel Lopez
(74) *Attorney, Agent, or Firm* — Renner, Otto, Boisselle & Sklar, LLP

(57) ABSTRACT

A hydrostatic assembly employing a $1^{st}$ hydraulic piston drive unit is described in which the output is increased without using additional servo assemblies by incorporating a $2^{nd}$ hydraulic piston drive unit, coupling the drive shafts of both drive units together, and employing a common means to simultaneously adjust displacement of both the $1^{st}$ and $2^{nd}$ hydraulic piston drive units. In such embodiments, coupling the drive shafts together such that the $1^{st}$ hydraulic piston drive unit is rotationally offset with respect to the $2^{nd}$ hydraulic piston drive allows for a reduction in the ampli- (Continued)

tude of pressure pulsations associated with the hydrostatic assembly output, thereby smoothing out operation and improving durability.

21 Claims, 8 Drawing Sheets

(51) Int. Cl.
F16H 61/423 (2010.01)
F16H 61/433 (2010.01)
F16H 61/44 (2006.01)
F16H 47/02 (2006.01)

(52) U.S. Cl.
CPC ...... F16H 61/452 (2013.01); F16H 2039/105 (2013.01); F16H 2047/025 (2013.01)

(56) References Cited

U.S. PATENT DOCUMENTS

2004/0261408 A1 12/2004 Fleming et al.
2010/0212309 A1 8/2010 Dyck et al.

* cited by examiner

HYDROSTATIC ASSEMBLY

INTRODUCTION

The present invention relates generally to a hydrostatic assembly.

Hydrostatic modules or assemblies are hydraulic devices used in hydrostatic and power splitting transmissions to effect ratio changes between the transmission input and output. Such assemblies typically comprise two hydraulic piston drive units and may be of a bent axis or an axial piston drive design. The two drive units are in fluid communication with each other. One of the hydraulic piston drive units typically functions as a pump and the other typically functions as a motor. Depending on the transmission design, the role of the pump and motor may be permanently or alternately assigned depending on the transmission mode. The speed and torque ratios between the input and output shafts of the module are determined by the displacement ratio between the two hydraulic piston drive units. By making at least one of the drive units a variable displacement type, the speed and torque ratio of the module may be varied.

The amount of power and torque to be transferred through the module will determine the size of the components. Generally, greater torque requires larger displacement drive units. With larger displacement drive units the allowable or permitted operating speed may be reduced as the mass of the rotating components is increased due to the increased size of the drive units. In a transmission where the drive units are permanently assigned as each of a pump and motor, a large motor and a small pump are typically used. However, if different size drive units are used, different rotating components for the pump and motor may be required.

U.S. 2010/0212309 describes a dual hydrostatic assembly with a common shaft driving the two pumps where the two pumps are arranged opposite one another and the input shafts rotate about the same axis. Similarly, the two motors have a common shaft where the two motors are arranged opposite one another and the out shafts rotate about the same axis. Each of the pumps and motors are arranged in separate rotatable yokes.

DE1064311 discloses a hydraulic module with two bent axis piston drive units, one functioning as pump and the other functioning as motor, where the pump and motor cylinder blocks rotate within a common yoke. However, the cylinder blocks are set at different angles and the angle between respective cylinder blocks and shafts of each bent axis piston drive unit is altered using the common yoke assembly.

Despite advances in the art, there remains a continuing need for durable hydrostatic assemblies that can produce greater displacements and transfer greater power and torque, while remaining compact in size, smooth in operation, and simple in design. The present invention addresses this need and provides other advantages as discussed in more detail below.

SUMMARY OF THE INVENTION

The output associated with a $1^{st}$ hydraulic piston drive unit in a hydrostatic assembly can be increased without using additional servo assemblies by incorporating a $2^{nd}$ hydraulic piston drive unit, coupling the drive shafts of both drive units together, and employing a common means to simultaneously adjust displacement of both the $1^{st}$ and $2^{nd}$ hydraulic piston drive units. Alternatively, this method may be used to reduce the piston size needed to provide a given output from a $1^{st}$ hydraulic piston drive in a hydrostatic assembly.

As a further advantage, this approach may be used to reduce the amplitude of pressure pulsations associated with the output from the hydrostatic assembly. In such embodiments, coupling the drive shafts of the $1^{st}$ and $2^{nd}$ hydraulic piston drive units such that the $1^{st}$ hydraulic piston drive unit is rotationally offset with respect to the $2^{nd}$ hydraulic piston drive allows for a reduction in the amplitude of the pressure pulsations.

Hydrostatic assemblies of the invention comprise a housing, a pivot axis, $1^{st}$ and $2^{nd}$ hydraulic piston drive units, and common means for simultaneously adjusting displacement of the $1^{st}$ and $2^{nd}$ hydraulic piston drive units. Each of the $1^{st}$ and $2^{nd}$ hydraulic piston drive units comprises a cylinder block with ports, pistons within the cylinders in the cylinder block, and a drive shaft mounted to the housing, in which the drive shafts of $1^{st}$ and $2^{nd}$ hydraulic piston drive units are coupled together (e.g. using a belt and pulleys, using engaged gears, etc. It should also be noted that the coupling may be accomplished outside of the immediate assembly shown and could encompass each shaft connected to a different drive wheel of a vehicle with contact with the ground serving as the final link.) The common means for adjusting is mounted on the pivot axis and is capable of rotation. The hydrostatic assembly further comprises a $3^{rd}$ hydraulic piston drive unit and $2^{nd}$ means for adjusting displacement of the $3^{rd}$ hydraulic piston drive unit. The $3^{rd}$ hydraulic piston drive unit also comprises a cylinder block with ports, pistons within the cylinders in the cylinder block, and a drive shaft mounted to the housing. The $2^{nd}$ means for adjusting is also mounted on the pivot axis and is capable of rotation independently of the common means. Finally, the hydrostatic assembly also comprises at least one fluid passage fluidly connecting the ports of the cylinder blocks in the $1^{st}$ and $2^{nd}$ hydraulic drive units to the ports of the cylinder block in the $3^{rd}$ hydraulic drive unit.

In one embodiment appropriate for use with bent axis piston drive units, the pivot axis is a yoke pivot axis and the housing comprises the yoke pivot axis. Further, the common means for adjusting displacement is a common yoke comprising at least one fluid passage therein. And the cylinder blocks and ports of the $1^{st}$ and $2^{nd}$ hydraulic drive units are mounted to the common yoke. Further still, the $2^{nd}$ means for adjusting displacement is a $2^{nd}$ yoke mounted on the yoke pivot axis adjacent the common yoke, and the $2^{nd}$ yoke comprises at least one fluid passage therein. And the cylinder block and ports of the $3^{rd}$ hydraulic drive unit are mounted to the $2^{nd}$ yoke. In this embodiment, the at least one fluid passage connects the ports of the cylinder blocks in the $1^{st}$ and $2^{nd}$ hydraulic drive units to a hydraulic rotary joint located between the common yoke and the $2^{nd}$ yoke. And further, the at least one fluid passage fluidly connects the hydraulic rotary joint to the ports of the cylinder block in the $3^{rd}$ hydraulic drive unit.

In this embodiment of a hydrostatic assembly, the $1^{st}$, $2^{nd}$, and $3^{rd}$ hydraulic piston drive units can all be bent axis piston drive units. And optionally, all of the $1^{st}$, $2^{nd}$, and $3^{rd}$ bent axis piston drive units can essentially be the same type of unit. Advantageously then, only one drive unit type may need to be sourced to manufacture the improved hydrostatic assembly.

In a second embodiment appropriate for use with axial piston drive units, the pivot axis is a swashplate pivot axis, and the common means for adjusting displacement is a common swashplate. Here, the cylinder blocks and ports of the 1st and 2nd hydraulic drive units are mounted to the housing. Further, the 2nd means for adjusting displacement is a 2nd swashplate mounted on the swashplate pivot axis adjacent the common swashplate. And the cylinder block and ports of the 3rd hydraulic drive unit are mounted to the housing. In this embodiment, the housing comprises the least one fluid passage connecting the ports of the cylinder blocks in the 1st and 2nd hydraulic drive units to the ports of the cylinder block in the 3rd hydraulic drive unit.

In this second embodiment of a hydrostatic assembly, the 1st, 2nd, and 3rd hydraulic piston drive units can all be axial piston drive units. And as before, optionally all of the 1st, 2nd, and 3rd axial piston drive units can essentially be the same type of unit.

More complex embodiments can also be considered. For example, the hydrostatic assembly can comprise a 4th fourth hydraulic piston drive unit in which the drive shafts of the 3rd and 4th hydraulic piston drive units are coupled together. (In a like manner to the other drive units, the 4th hydraulic piston drive unit also would comprise a cylinder block with ports, pistons within the cylinders in the cylinder block, and a drive shaft mounted to the housing). Also for example, hydrostatic assemblies comprising both bent axis and axial piston drive units which have been appropriately configured together may also be contemplated in principle.

In certain preferred embodiments of hydrostatic assemblies, the drive shafts of the 1st and 2nd hydraulic piston drive units can be essentially parallel. And further, the cylinder blocks of the 1st and 2nd hydraulic piston drive units can be coupled together at the same angle with respect to their drive shafts, thereby functioning as a drive unit which has been doubled in size. In a like manner, the drive shaft of the 3rd hydraulic piston drive unit can also be essentially parallel to the drive shafts of the 1st and 2nd hydraulic piston drive units. Such embodiments are suitable for applications in which the 1st and 2nd hydraulic piston drive units act as a motor and the 3rd hydraulic piston drive unit acts as a pump.

In a simple arrangement, the drive shafts of the 1st and 2nd hydraulic piston drive units are coupled to drive at the same speed. However, the drive shafts can advantageously be coupled such that the 1st hydraulic piston drive unit is rotationally offset with respect to the 2nd hydraulic piston drive unit. In this way, the pressure pulsations associated with the 1st hydraulic piston drive unit are staggered with respect to those of the 2nd drive unit. And as a consequence, the magnitude of the pressure pulsations is less than it would be if the drive units were synchronized and the output fluid pressure profile is smoothed out, thereby improving durability. In one convenient arrangement, the drive shafts can be coupled such that the 1st hydraulic piston drive unit is rotationally offset at half the angle between two rotationally adjacent cylinders.

Typically, the 1st and 2nd hydraulic piston drive units each comprise a plurality of ports and pistons. In a practical exemplary embodiment, the 1st and 2nd hydraulic piston drive units can for instance each comprise nine pistons. And the two drive units can be rotationally offset such that the 1st hydraulic piston drive unit is rotationally offset 20 degrees between two rotationally adjacent cylinders in the 2nd drive unit.

As mentioned, the invention provides for improvements in output from hydrostatic assemblies without the need for additional servo assemblies. A controllable hydrostatic assembly of the invention thus comprises the aforementioned hydrostatic assembly, a single servo assembly to control the angle of the displacement adjusting common means on the pivot axis, and a single servo assembly to control the angle of the 2nd displacement adjusting means on the pivot axis.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
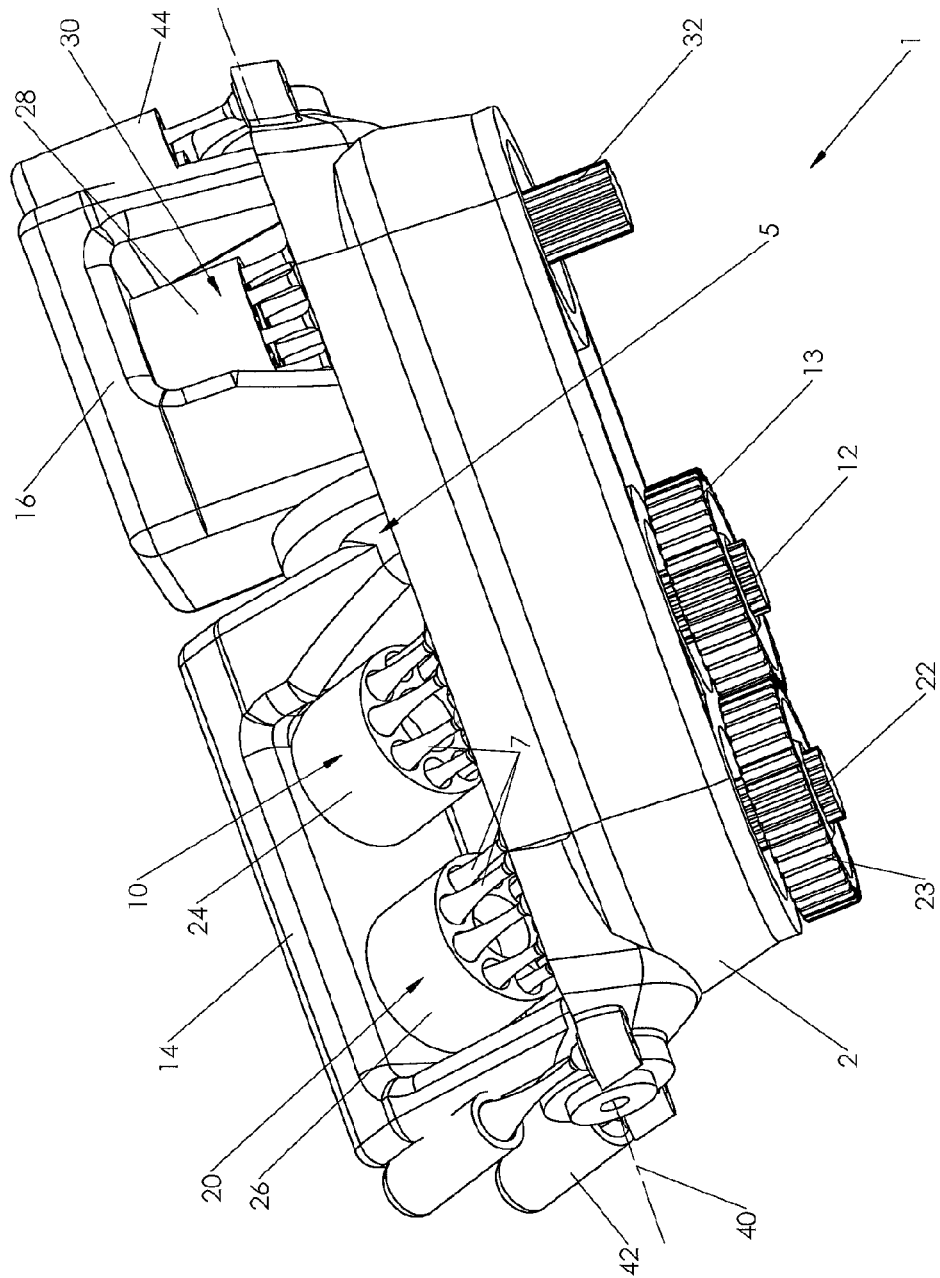
FIG. 1 schematically illustrates a hydrostatic assembly according to a first embodiment of the invention.

FIG. 1 schematically illustrates a hydrostatic assembly or hydraulic module 1 according to a first embodiment of the invention. The hydrostatic assembly 1 comprises a common housing 2 that supports respective drive shafts 12, 22, 32 of each of a first bent axis piston drive unit 10, second bent axis piston drive unit 20, and third bent axis piston drive unit 30. Housing 2 includes a bearing or bearings (not shown) mounted within housing 2 to allow each of the drive shafts 12, 22, 32 to rotate. That is to say that each of drive shafts 12, 22, 32 are rotatably arranged or mounted within the housing 2. Each of the drive shafts 12, 22, 32 of the bent axis piston drive units include splines to allow the shafts to be coupled to other input or output mechanisms.

Two yokes are employed in the embodiment of FIG. 1, namely common yoke 14 and second yoke 16, and both are rotatably mounted on pivot axis 40. Second yoke 16 supports a cylinder block 28 of third bent axis piston drive unit 30. Cylinder block 28 of third bent axis piston drive unit 22 is rotatably mounted within second yoke 16. Second yoke 16 is generally u-shaped and includes two extending arms that are rotatably mounted to the housing 2. The axis of rotation of second yoke 16 is that of pivot axis 40 and crosses (e.g., is perpendicular to) the axis of the drive shaft 32 of third bent axis piston drive unit 30. Rotation of second yoke 16 with respect to housing 2 is provided by a servo assembly mechanism 44. In this example, servo assembly mechanism 44 is provided by two antagonistic hydraulic actuators. In other words, two hydraulic actuators are used to rotate second yoke 16, a first actuator to rotate second yoke 16 in a clockwise direction and a second actuator to rotate second yoke 16 in a counter clockwise direction.

Common yoke 14 supports cylinder block 24 of first bent axis piston drive unit 10 and cylinder block 26 of second bent axis piston drive unit 20. The respective cylinder blocks 24, 26 of first and second bent axis piston drive units 10, 20 are rotatably mounted within common yoke 14. Common yoke 14 is generally u-shaped and includes two extending arms that are rotatably mounted to housing 2. The axis of rotation of common yoke 14 is that of pivot axis 40 and crosses (e.g., is perpendicular to) the axes of drive shafts 12, 22 of first and second bent axis piston drive units 10, 20. Rotation of common yoke 14 with respect to housing 2 is provided by servo assembly mechanism 42. In this example, servo assembly mechanism 42 is provided by two antagonistic hydraulic actuators. That is to say that two hydraulic actuators are used to rotate common yoke 14, a first actuator to rotate common yoke 14 in a clockwise direction and a second actuator to rotate common yoke 14 in a counter clockwise direction.

Cylinder block 28 of third bent axis piston drive unit 30 is fluidically coupled to second yoke 16. That is two say that fluid may pass between cylinder block 28 of third bent axis piston drive unit 30 and second yoke 16. The respective cylinder blocks 24, 26 of first and second bent axis piston drive units 10, 20 are fluidically coupled to one another and to common yoke 14. That is two say that fluid may pass between respective cylinder blocks 24, 26 of first and second bent axis piston drive units 10, 20 and common yoke 14. Further, common and second yokes 14, 16 are in fluid communication with one another such that fluid may pass between the first, second and third bent axis piston drive units. The connection between common and second yokes 14, 16 is made via a hydraulic rotary joint 5 such as is described in detail in U.S. 2010/0212309.

According to embodiments of the invention, control of servo assemblies 42, 44 may be by any means such as mechanical, hydraulic, electronic or combination thereof. According to the first embodiment each servo assembly 42, 44 is controlled by an electronically actuated control valve, a sub-system to supply pressurized control fluid to the control valve and a microprocessor to control the opening and close of the control valve.

Each of common and second yokes 14, 16 are manufactured in at least two parts. A first support portion that includes a recess or bucket for supporting the cylinder blocks of the respective bent axis piston drive units and includes fluidic channels for coupling with the cylinder blocks of the respective bent axis piston drive units. Each yoke also includes second arm portions that extend from the first support portion and also include fluidic channels that are coupled to the fluidic channels of the first support portion and allow fluid to enter and exit the yoke. In this example, fluid enters and exits each yoke at the pivot point between common and second yokes 14, 16.

Drive shafts 12, 22 of first and second bent axis piston drive units 10, 20 are mechanically coupled together. In this example, the mechanical coupling is achieved using two engaged gears 13, 23. Also in this example, drive shafts 12 and 22 rotate opposite each other but the addition of an idler gear(s) between them would allow for rotation in the same direction. Rotation in the same direction though would require different fluid routing in common yoke 14 between the cylinder blocks 26 and 28. In other examples, first and second bent axis piston drive units 10, 20 may be coupled using other mechanical couplings, for example each drive shaft 12, 22 may include sprockets and the sprockets are coupled using a chain. Furthermore here, drive shafts 12, 22 of first and second bent axis piston drive units 10, 20 are parallel to each other. Common and second yokes 14, 16 illustrated in the figure are independently rotatable.

Figure 2:
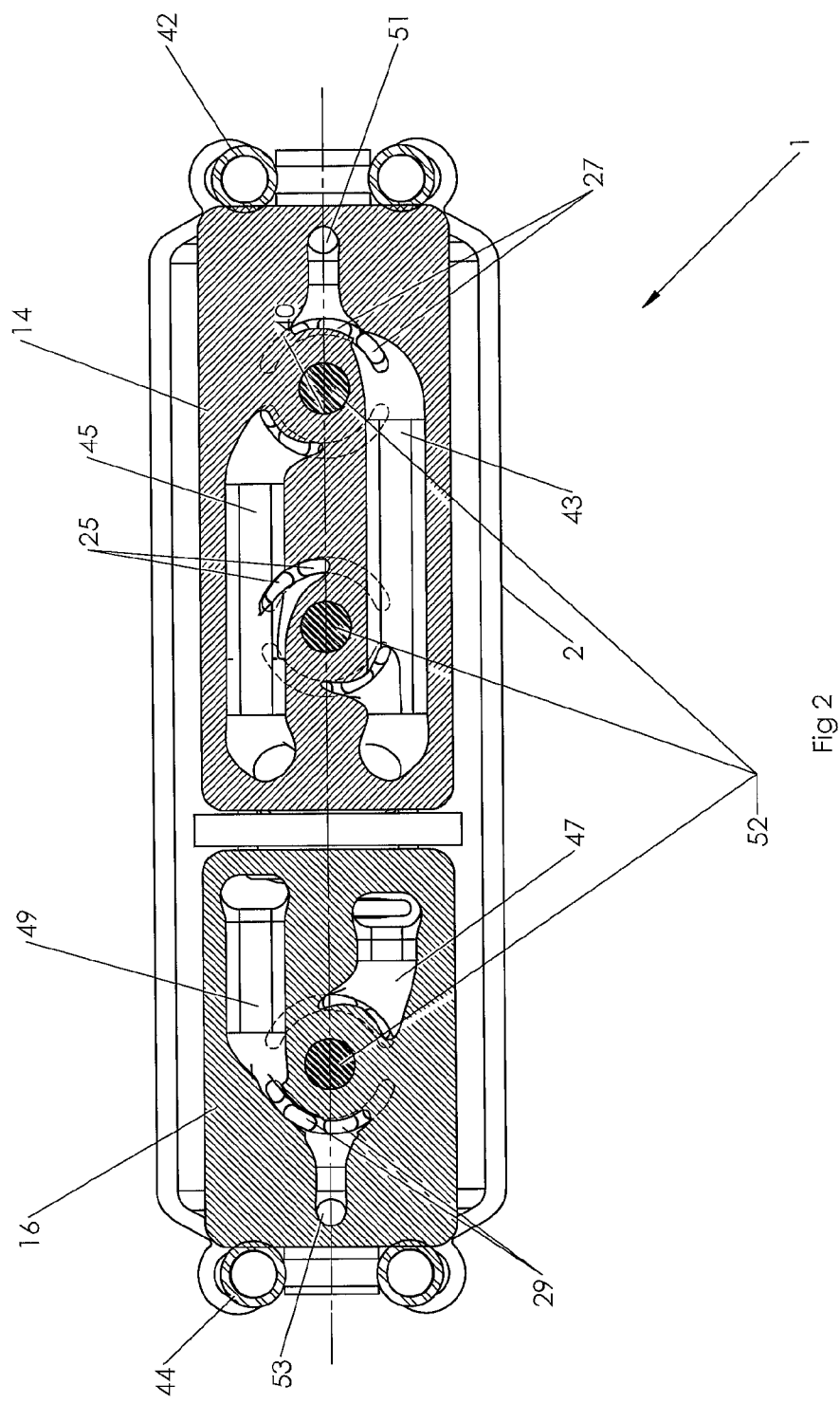
FIG. 2 schematically illustrates a section in the plane of and through the bucket portions of the common and second yokes of the hydrostatic assembly of FIG. 1, when both the common and second yokes are in alignment.

FIG. 2 schematically illustrates a section in the plane of and through the bucket portions of common yoke 14 and second yoke 16 of hydrostatic assembly 1 when both the common and second yokes 14, 16 have been rotated to be in alignment with each other on pivot axis 40. The sectioned areas of common and second yokes 14, 16 are shown with diagonal lines in FIG. 2. Like features of FIGS. 1 and 2 are labeled using the same reference numerals.

Cylinder blocks 24, 26, 28 of bent axis piston drive units 10, 20, 30 rotate about their respective drive shafts 12, 22, 32. Each cylinder block comprises a plurality of ports and pistons within the cylinders of the blocks. Certain ports 25, 27, and 29 of cylinder blocks 24, 26, and 28 respectively are visible in the view of FIG. 2. Common yoke 14 includes first fluidic passage 43 that couples together certain ports from each of first and second bent axis piston drive units (not visible in this view). Common yoke 14 also includes a second fluidic passage 45 that couples together other ports from each of first and second bent axis piston drive units (again not visible in this view). Pistons 7 (visible in FIG. 1 but not in FIG. 2) of each of first and second bent axis piston drive units 10, 20 are attached to pivot axis 40 and in operation either draw hydraulic fluid in or push hydraulic fluid out of their respective cylinder blocks depending on their position in the rotation cycle. The amount of fluid drawn in or pushed out depends on the bend angle the cylinder block makes with respect to its drive shaft axis. First fluidic passage 43 is in fluidic communication with certain ports 25, 27 of first and second bent axis piston drive units 10, 20 via respective arcuate shapes formed in channel 43. These arcuate shapes of first fluidic passage 43 provide a fluidic connection between several of the pistons in each of first and second bent axis piston drive units 10, 20. All of the pistons connected by first fluidic passage 43 are drawing fluid in or all of the pistons connected by first fluidic passage 43 are pushing fluid out. In a like manner, second fluidic passage 45 is in fluidic communication with first and second bent axis piston drive units 10, 20 via respective arcuate shapes formed in passage 45. Each of these arcuate shapes in second fluidic passage 45 provides a fluidic connection between several other pistons in each of first and second bent axis piston drive units 10, 20. First fluidic passage 43 and second fluidic passage 45 provide for allow hydraulic fluid to be drawn in and to be pushed out respectively, or vice versa, depending on the bend angle direction that the cylinder blocks make with respect to pivot axis 40.

In the embodiment of FIG. 2, first and second bent axis piston drive units 10, 20 are directly coupled using a pair of engaged gears 13, 23 such that when first and second bent axis piston drive units 10, 20 rotate, each gear 13, 23 rotates in an opposite direction. That is to say that when first bent axis piston drive unit 10 rotates in a clockwise direction, second bent axis piston drive unit 20 rotates in a counter-clockwise direction.

As depicted in FIG. 2, second yoke 16 is aligned with common yoke 14. Second yoke 16 includes third fluidic passage 47 and fourth fluidic passage 49 that connect to certain ports 29 of third bent axis piston drive unit (not visible in this view). Third fluidic passage 47 and fourth fluidic passage 49 are also coupled to first fluidic passage 43 and second fluidic passage 45 via hydraulic rotary joint 5, thereby allowing for appropriate passages of hydraulic fluid between common yoke 14 and second yoke 16.

Figure 3:
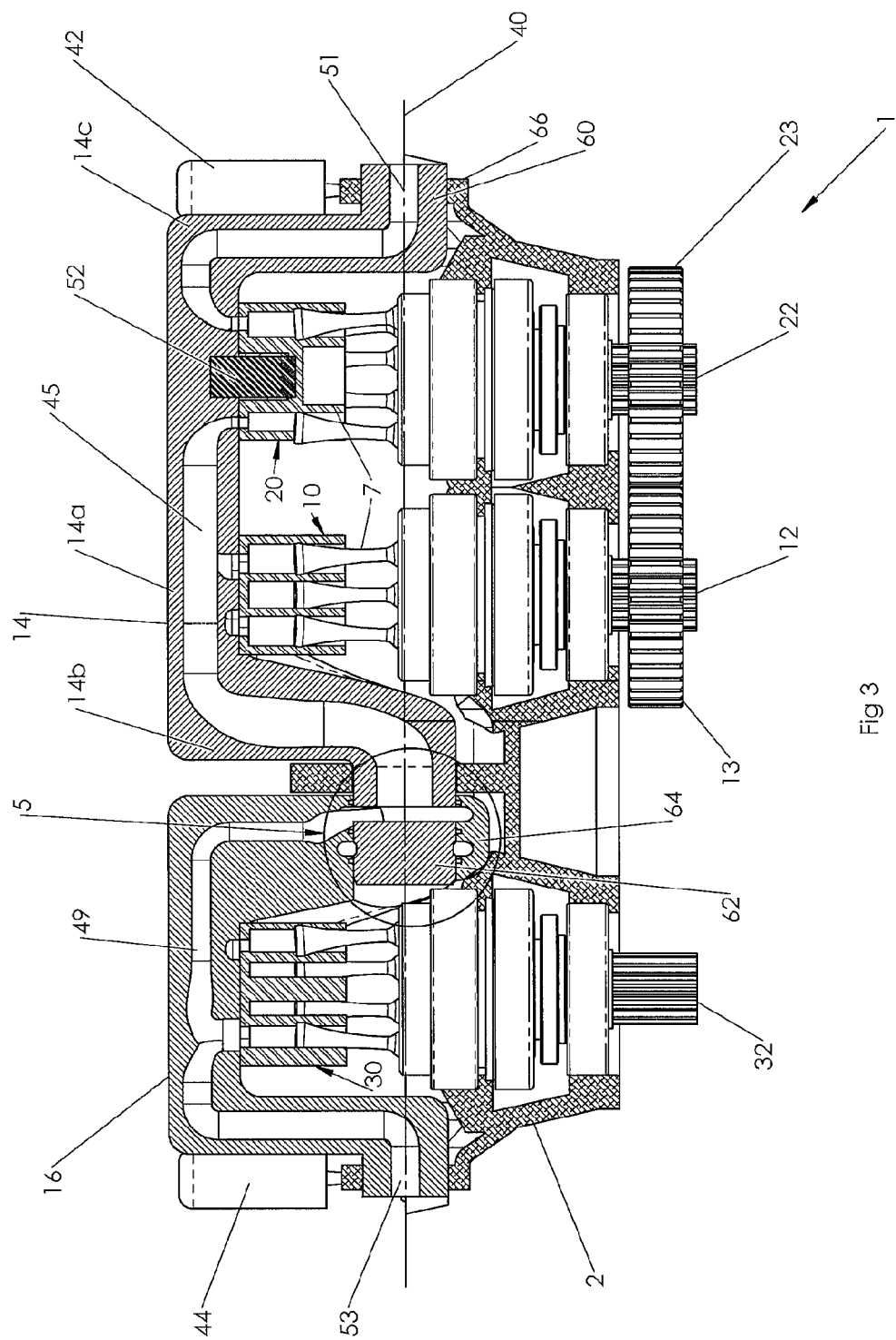
FIG. 3 schematically illustrates a section in the plane of the arm portions of the common and second yokes and through a fluidic passage of the hydrostatic assembly of FIG. 1, when both the common and second yokes are in alignment.

FIG. 3 schematically illustrates a section in the plane of the arm portions of the common and second yokes and taken through second fluidic passage 45 of hydrostatic assembly 1, again when both the common and second yokes are in alignment as in FIG. 2. Like features of FIGS. 1, 2 and 3 are labeled using the same reference numerals.

Each of first and second fluidic connections 43, 45 of common yoke 14 extend from bucket portion 14a to arm portion 14b illustrated on the left hand side of common yoke 14 in FIG. 3. Each of first and second fluid connections 43, 45 extend from bucket portion 14a through to left hand arm portion 14b of common yoke 14. Left hand arm portion 14b of common yoke 14 includes spigot 62 that is engaged with opening 64 of second yoke 16 that allows common yoke 14 to rotate with respect to second yoke 16. Right hand arm portion 14c of common yoke 14 includes spigot 60 that is rotatable within opening 66 of housing 2 that allows common yoke 14 to rotate with respect to housing 2.

Hydraulic rotary joint 5 making the fluid connection between common and second yokes 14, 16 is described in U.S. 2010/0212309. Generally, each of fluid passages 43, 45 of common yoke 14 terminate at the surface of spigot 62 with a circumferential channel on the outer surface of spigot 62 that aligns with a corresponding circumferential channel formed on the inner surface of opening 64 of second yoke 16. Each of the corresponding circumferential channels formed on the inner surface of opening 64 of second yoke 16 are in fluidic communication with third bent axis piston drive unit 30 in a similar manner to that described for first and second bent axis piston drive units 10, 20.

Each of bent axis piston drive units 10, 20, 30 is generally the same in operation and arrangement. Looking at first bent axis piston drive unit 10, for example, there is provided a drive shaft 12 for coupling the bent axis piston drive unit to a rotating source (e.g., an electric motor) or to a mechanism or shaft to be rotated. The bent axis piston drive unit includes cylinder block 24 that includes at least two cylinders and typically an odd number of cylinders. In this example each of the bent axis units includes nine cylinders. Each cylinder includes a piston 7 that is movable linearly within the cylinder. Cylinder block 24 is rotatable about a spigot (e.g. spigot 52 associated with bent axis piston drive unit 20) that is provided in common yoke 14. The distal ends of pistons 7 are movable within the cylinders and the proximal ends of pistons 7 are coupled to drive shaft 12, typically using a ball and socket arrangement. In operation, drive shaft 12 and cylinder block 24 rotate at the same speed, since drive shaft 12 and cylinder block 24 are coupled via the pistons or other timing method such as a synchronization shaft. Also, as cylinder block 24 rotates, the pistons 7 will displace fluid dependent on the angle between drive shaft 12 and the cylinder block 24. This angle is set by the angle of common yoke 14 within housing 2. That is to say that if the cylinder block 24 and drive shaft 12 are in line, the pistons will not displace fluid. Cylinder block 24 may be driven by drive shaft 12 or cylinder block 24 may drive the shaft dependent on whether the bent axis piston drive unit is arranged as a motor or a pump.

Figure 4:
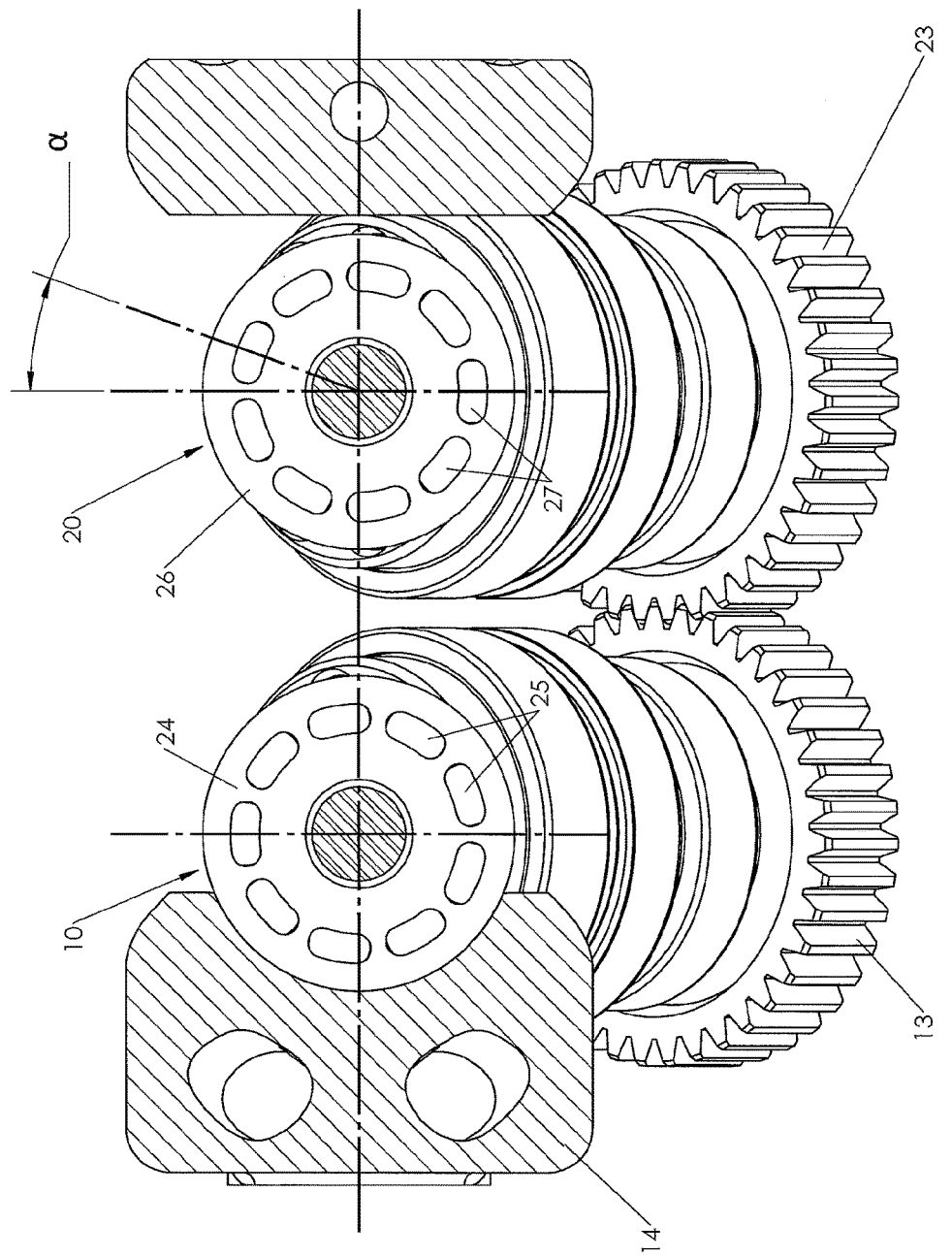
FIG. 4 schematically illustrates a section through the common yoke illustrated in FIG. 1.

FIG. 4 schematically illustrates a section through the common yoke illustrated in FIG. 1 such that the cylinder blocks of first and second bent axis piston drive units 10, 20 are visible. The sectioned elements of common yoke 14 are illustrated with diagonal lines. Like features of FIGS. 1, 2, 3 and 4 are labeled using the same reference numerals.

Gears 13, 23 that couple the respective drive shafts 12, 22 of each of first and second bent axis piston drive units 10, 20 allow first and second bent axis piston drive units 10, 20 to be timed relative to each other as is illustrated in FIG. 4. That is to say that arrangement of gears 13, 23 allows first and second bent axis piston drive units to be rotationally offset with respect to one another. If, for example, first and second bent axis piston drive units 10, 20 are timed such that an opening event of a cylinder of first bent axis piston drive unit 10 occurs at the same time as the opening event of a cylinder of second bent axis piston drive unit 20, the amplitude of the resulting pressure pulsation within common yoke 14 may be quite high. An opening event will be understood to be a piston beginning to draw fluid into a cylinder or a piston starting to push fluid out of a cylinder. The resulting pressure pulsation may be reduced by staggering the opening events of the cylinders of first and second bent axis piston drive units 10, 20. As depicted in FIG. 4, the opening events of the cylinders of first bent axis piston drive unit 10 are staggered by an angle $\alpha$ from the opening events of the cylinders of second bent axis piston drive unit 20. Accordingly, the number of pulsations per cycle is doubled, but the amplitude is halved compared to the scenario in which the opening events of cylinders in first and second bent axis piston drive units 18, 20 coincide. By reducing the amplitude of the pressure pulsations, this staggering technique may reduce noise, smooth out operation, and improve fatigue life of the hydraulic assembly. Further, such assemblies can operate at higher shaft speeds because the individual components such as bearings are smaller and can tolerate higher speeds. These benefits can all be very important in commercial applications. The angle $\alpha$ is determined by the number of cylinders in the cylinder block and is less than the angle of rotation between two adjacent cylinders. In this example, there are nine cylinders such that the angle between adjacent cylinders is 40 degrees. And thus, angle $\alpha$ is 20 degrees, which is half way between two rotationally adjacent cylinders. It will be appreciated that angle $\alpha$ may be an integer value between 1 and 39 degrees in this example.

During operation, third bent axis piston drive unit 30 may be operated as a pump and first and second bent axis piston drive units 10, 20 may be operated as a motor driven by the pump. Common and second yokes 14, 16 are rotatable with respect to housing 2 to alter the angle between the drive shaft and the cylinder block of each of the bent axis piston drive units. By altering the angle between the drive shaft and the cylinder block of each of the bent axis piston drive units, the relative speed and size of the system is altered. It will be appreciated that in this example, the angle between the drive shaft and the cylinder block of each of first and second bent axis piston drive units 10, 20 is altered at the same time and independent of the angle between the drive shaft and the cylinder block of third bent axis piston drive unit 30.

Figure 5:
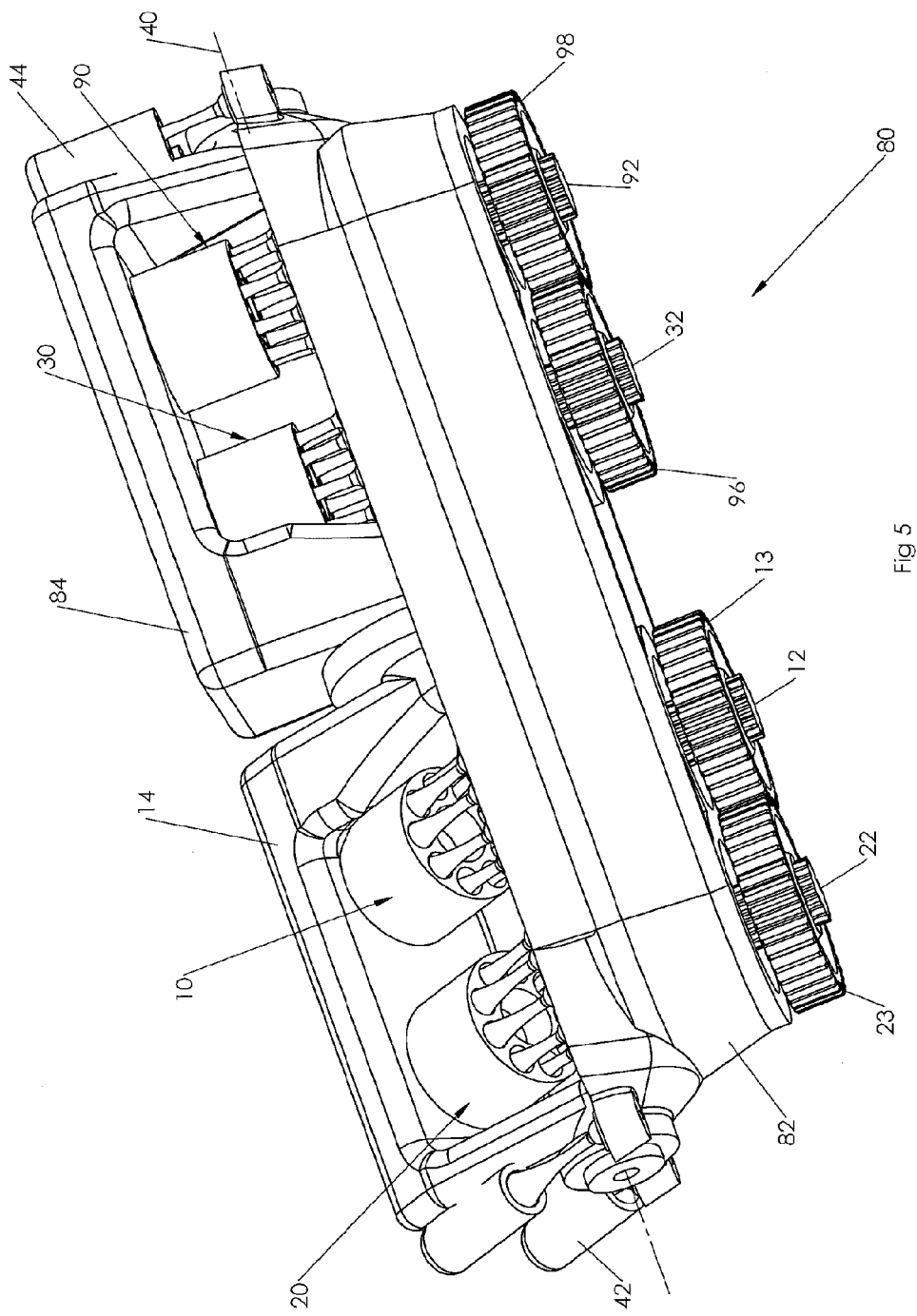
FIG. 5 schematically illustrates a hydrostatic assembly according to a second embodiment of the invention.

FIG. 5 schematically illustrates a hydrostatic assembly according to a second embodiment of the invention. Like features of FIGS. 1 and 5 are labeled using the same reference numerals. Hydrostatic assembly 80 comprises common housing 82 that supports respective drive shafts 12, 22, 32, 92 of each of first, second, third and fourth bent axis piston drive units 10, 20, 30, 90. Housing 82 includes a bearing (not shown) mounted within housing 82 to allow each of drive shafts 12, 22, 32, 92 to rotate. That is to say that each of the shafts 12, 22, 32, 92 are rotatably arranged or mounted within housing 82. Each of drive shafts 12, 22, 32, 92 of the bent axis piston drive units include splines to allow the shafts to be coupled to other input or output mechanisms.

Second common yoke 84 supports third and fourth bent axis piston drive units 30, 90. Common yoke 14 and associated bent axis piston drive units 10, 20 are the same as those described in association with the aforementioned first embodiment. Second common yoke 84 and associated bent axis piston drive units 30, 90 are similar in form and operation as common yoke 14 and associated bent axis piston drive units 10, 20 described in association with the first embodiment.

The shafts 32, 92 of third and fourth bent axis piston drive units 30, 90 are mechanically coupled together. In this example, the mechanical coupling is achieved using a gearset of two engaged gears 96, 98. Furthermore, the shafts 32, 92 of third and fourth bent axis piston drive units 30, 90 are parallel to each other.

In accordance with embodiments of the inventions, it is possible to use one size of rotating kit (bent axis piston drive unit, axial piston drive unit) to build multiple sizes of hydrostatic assemblies or modules. Thus, fewer distinct elements may be required to achieve multiple configurations. Furthermore, using two bent axis piston drive units (or axial piston drive units) rather than a single large hydraulic unit may result in a higher speed range of rotation being achieved because generally smaller units have a greater speed range than larger units. This can significantly improve the power density for a given size of hydrostatic assembly.

A hydrostatic assembly may be constructed using swashplate design units employing axial piston drive units according to a third embodiment of the invention. Here, the cylinder blocks and drive shafts of three or more drive units are supported in a housing. The pistons of the first and second axial piston drive units are supported by a common swashplate. A third axial piston drive unit is supported on a second swashplate. The first and second axial piston drive units are partnered together and function simultaneously as pump or motor.

Figure 6:
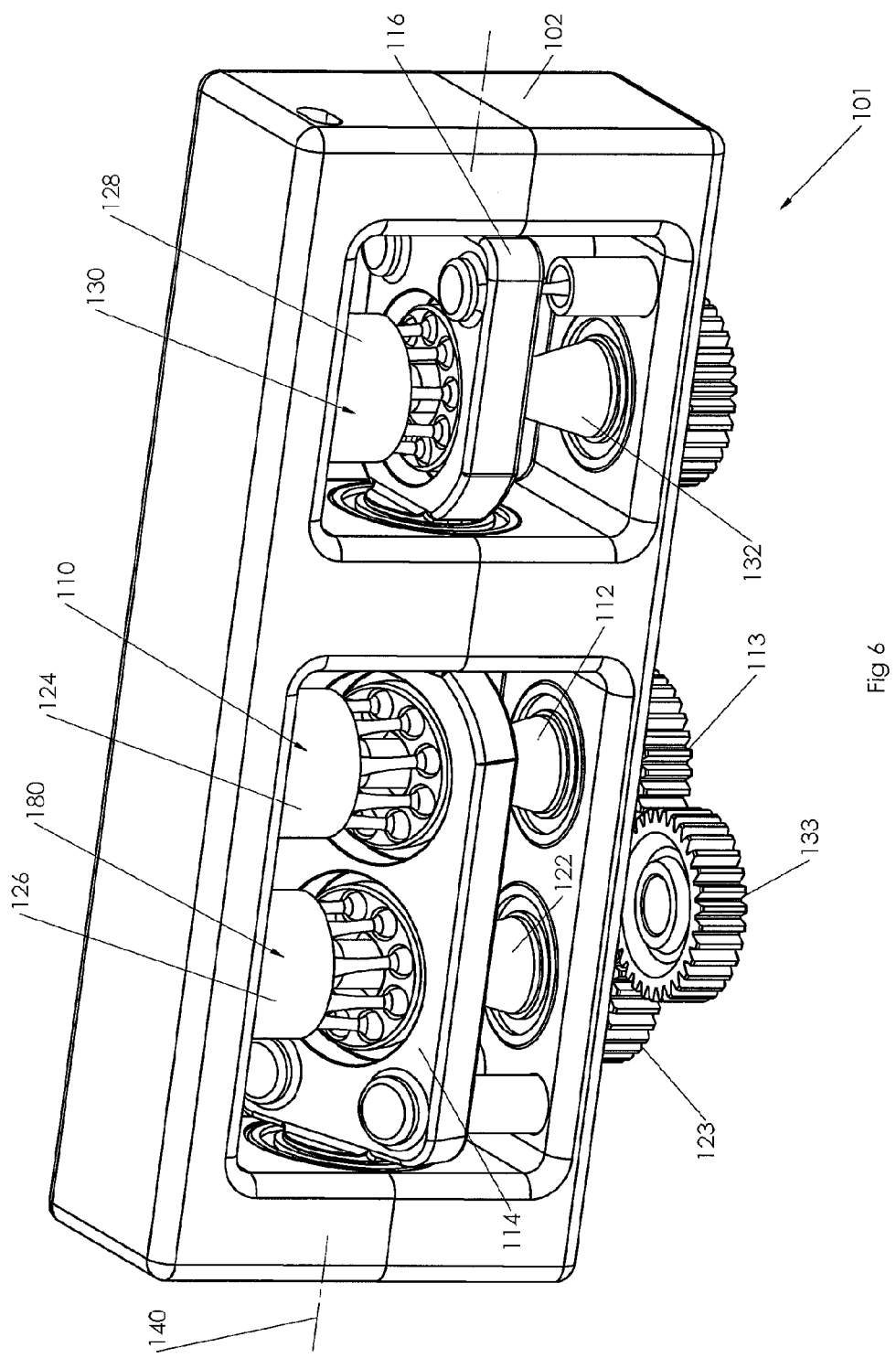
FIG. 6 schematically illustrates a hydrostatic assembly according to a third embodiment of the invention.
Figure 7:
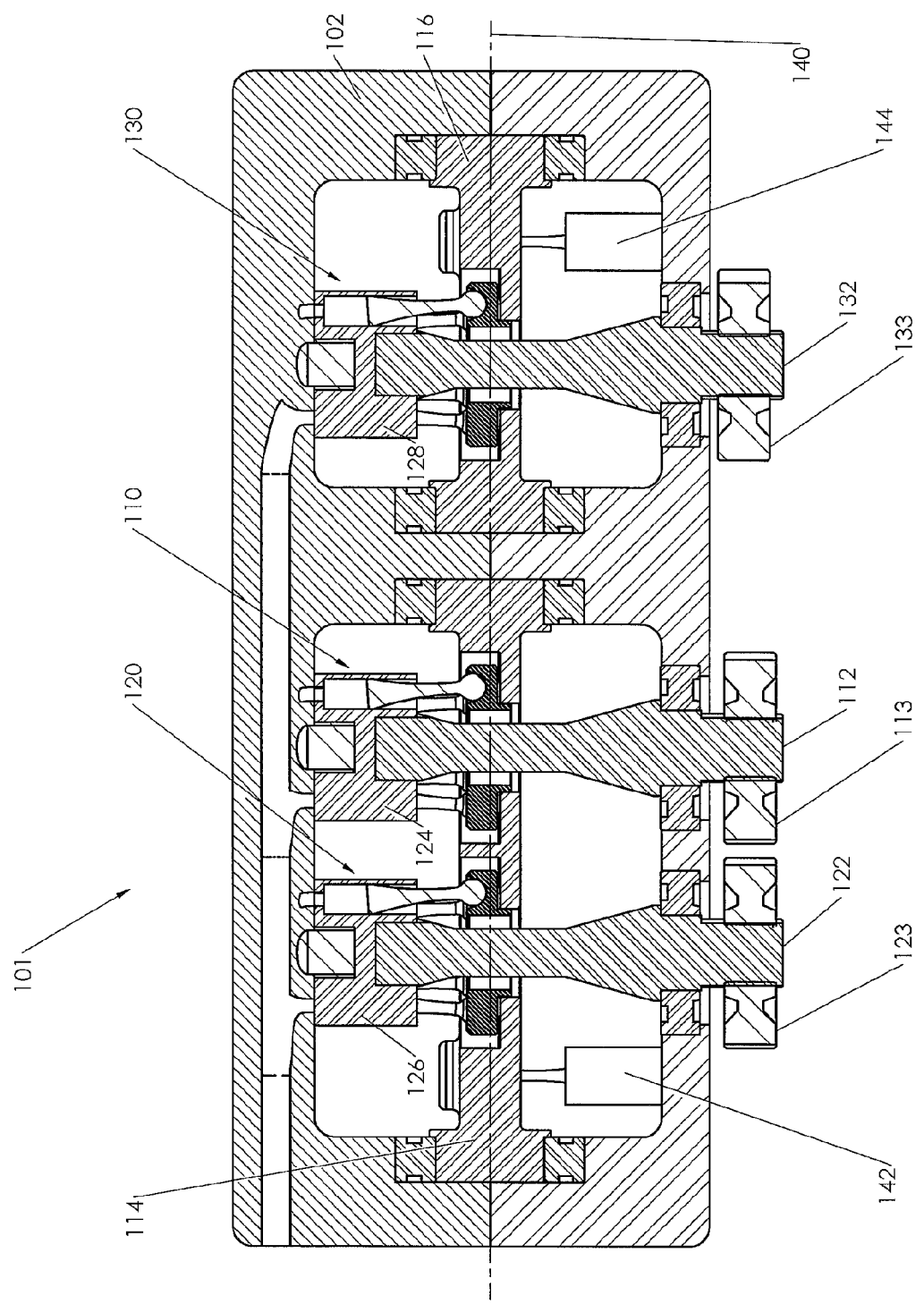
FIG. 7 schematically illustrates a section in a plane parallel to the drive shafts of the axial piston drive units and through a fluidic passage of the hydrostatic assembly of FIG. 6.

FIGS. 6 and 7 schematically illustrate a hydrostatic assembly according to such a third embodiment. In FIG. 6, hydrostatic assembly 101 comprises a common housing 102 that supports respective drive shafts 112, 122, 132 of each of first, second, and third axial piston drive units 110, 120, 130 respectively. Housing 102 includes a bearing (not called out in the figures) mounted within to allow each of the drive shafts 112, 122, 132 to rotate. And each of the drive shafts 112, 122, 132 include splines to allow the shafts to be coupled to other input or output mechanisms.

Two swashplates are employed in the embodiment of FIG. 6, namely common swashplate 114 and second swashplate 116, and both are rotatably mounted on common pivot axis 140. Housing 102 supports cylinder block 128 and second swashplate 116 supports the pistons of third axial piston drive unit 130. Cylinder block 128 of third axial piston drive unit 122 is rotatably mounted to housing 102. Rotation of second swashplate 116 with respect to housing 102 is provided by servo assembly mechanism 144. Housing 102 also supports cylinder block 124 of first axial piston drive unit 110 and cylinder block 126 of second axial piston drive unit 120. Common swashplate 114 supports the pistons of first axial piston drive unit 110 and second axial piston drive unit 120. The respective cylinder blocks 124, 126 of first and second axial piston drive units 110, 120 are rotatably mounted to housing 102. Rotation of common swashplate 114 with respect to housing 102 is provided by another servo assembly mechanism 142.

In a like manner to the preceding embodiments, cylinder block 128 of third axial drive unit 130 is fluidically coupled to first and second axial piston drive units 110, 120 through a similar arrangement of ports and passages in housing 102. No hydraulic rotary joint is required however in this swashplate embodiment. Also, control of the servo assemblies may be accomplished in a like manner to the preceding embodiments.

Drive shafts 112, 122 of first and second axial piston drive units 110, 120 are mechanically coupled together. In this example, the mechanical coupling is achieved using an additional gear 133 to couple together gears 113, 123 such that drive shafts 112 and 122 both rotate in the same direction.

FIG. 7 schematically illustrates a section in a plane parallel to the drive shafts of the axial piston drive units and through a fluidic passage of the hydrostatic assembly of FIG. 6. Like features of FIGS. 6 and 7 are labeled using the same reference numerals. As will be apparent to those in the art, except for differences relating to the use of swashplates in place of yokes, the elements and functions of the third embodiment are similar to those of the first embodiment.

Figure 8:
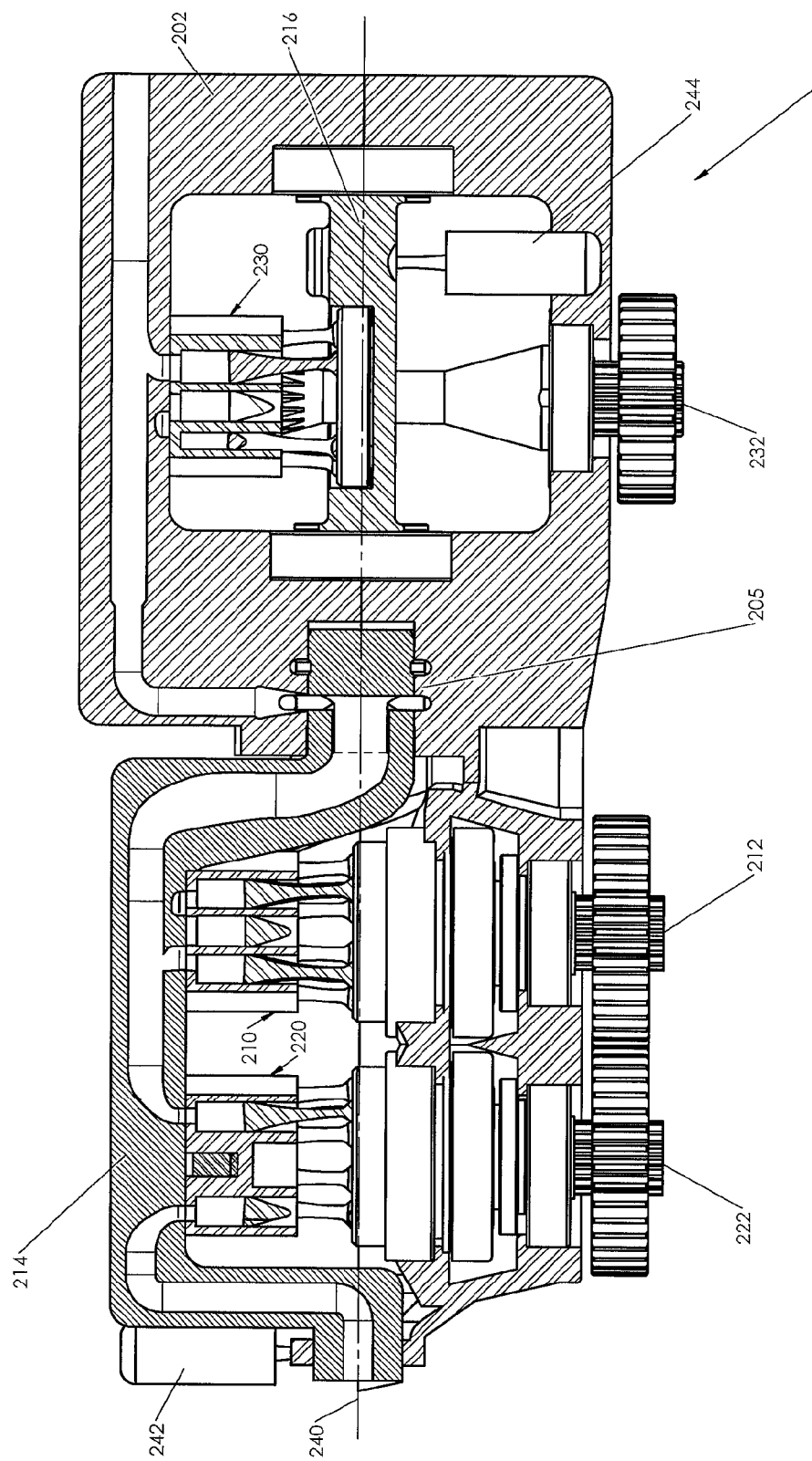
FIG. 8 schematically illustrates a section through a fourth embodiment of the invention comprising two bent axis piston drive units and one axial piston drive unit.

FIG. 8 schematically illustrates a section of an exemplary hydrostatic assembly according to yet other embodiments in which the hydraulic piston drive units include at least one bent axis piston drive unit and at least one axial piston drive unit. The section is in a plane parallel to the drive shafts of the hydraulic piston drive units and through a fluidic passage of the hydrostatic assembly. In FIG. 8, hydrostatic assembly 201 comprises a common housing 202 that supports respective drive shafts 212, 222, 232 of each of first, second, and third hydraulic drive units 210, 220, 230 respectively. Here however, first and second hydraulic drive units 210, 220 are bent axis piston drive units and third hydraulic drive unit 230 is an axial piston drive unit.

Further, the embodiment of FIG. 8 employs common yoke 214 and second swashplate 216 which are both rotatably mounted on common pivot axis 240. (Note in related embodiments, the swashplate axis could differ from the yoke axis.) In a similar manner to the preceding embodiments, second swashplate 216 supports the pistons of third axial piston drive unit 230. And this cylinder block is rotatably mounted to housing 202. Rotation of second swashplate 216 with respect to housing 202 is provided by a servo assembly mechanism 244. Common yoke 214 supports the two cylinder blocks of the first and second bent axis piston drive units 210, 220. As in the first embodiment, these two cylinder blocks are rotatably mounted within common yoke 214. Rotation of common yoke 214 with respect to housing 202 is provided by servo assembly mechanism 242.

In a like manner to the preceding embodiments, the cylinder block of third axial drive unit 230 is fluidically coupled to first and second bent axis piston drive units 210, 220 through a similar arrangement of ports and passages in housing 202. A modified hydraulic rotary joint 205 is employed. Control of the servo assemblies may be accomplished in a like manner to the preceding embodiments.

"Hybrid" embodiments like that illustrated in FIG. 8 can thus be considered for a hydrostatic assembly where the advantages of bent axis piston drive units might be preferred for a motor function and those of axial piston drive units might be preferred for a pump function, or vice versa. Further, use of an axial piston drive unit and accompanying swashplate allows for the output drive shaft to be a through-shaft extending through the top of the assembly.

All of the above U.S. patents, U.S. patent application publications, U.S. patent applications, foreign patents, foreign patent applications and non-patent publications referred to in this specification, are incorporated herein by reference in their entirety.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e. meaning "might") rather than the mandatory sense (i.e., meaning "must"). Similarly, the words "include", "including", and "includes" mean including, but not limited to.

The invention claimed is:

1. A hydrostatic assembly comprising:
    a housing;
    a pivot axis;
    $1^{st}$ and $2^{nd}$ hydraulic piston drive units, each drive unit comprising:
        a cylinder block with ports,
        pistons within the cylinders in the cylinder block, and
        a drive shaft mounted to the housing, wherein the drive shafts of $1^{st}$ and $2^{nd}$ hydraulic piston drive units are coupled together;
    common means for simultaneously adjusting displacement of the $1^{st}$ and $2^{nd}$ hydraulic piston drive units, the common means mounted on the pivot axis and capable of rotation;
    a $3^{rd}$ hydraulic piston drive unit comprising:
        a cylinder block with ports,
        pistons within the cylinders in the cylinder block, and
        a drive shaft mounted to the housing;
    $2^{nd}$ means for adjusting displacement of the $3^{rd}$ hydraulic piston drive unit, the $2^{nd}$ means mounted on the pivot axis and capable of rotation independently of the common means;
    at least one fluid passage fluidly connecting the ports of the cylinder blocks in the $1^{st}$ and $2^{nd}$ hydraulic drive units to the ports of the cylinder block in the $3^{rd}$ hydraulic drive unit.

2. The hydrostatic assembly of claim 1 wherein:
    the pivot axis is a yoke pivot axis and the housing comprises the yoke pivot axis;
    the common means for adjusting displacement is a common yoke comprising at least one fluid passage therein;
    the cylinder blocks and ports of the $1^{st}$ and $2^{nd}$ hydraulic drive units are mounted to the common yoke;
    the $2^{nd}$ means for adjusting displacement is a $2^{nd}$ yoke mounted on the yoke pivot axis adjacent the common yoke, and the $2^{nd}$ yoke comprises at least one fluid passage therein;
    the cylinder block and ports of the $3^{rd}$ hydraulic drive unit are mounted to the $2^{nd}$ yoke; and
    the at least one fluid passage connects the ports of the cylinder blocks in the $1^{st}$ and $2^{nd}$ hydraulic drive units to a hydraulic rotary joint located between the common yoke and the $2^{nd}$ yoke, and further the at least one fluid passage fluidly connects the hydraulic rotary joint to the ports of the cylinder block in the $3^{rd}$ hydraulic drive unit.

3. The hydrostatic assembly of claim 2 wherein the $1^{st}$, $2^{nd}$, and $3^{rd}$ hydraulic piston drive units are bent axis piston drive units.

4. The hydrostatic assembly of claim 3 wherein the $1^{st}$, $2^{nd}$, and $3^{rd}$ bent axis piston drive units are essentially the same.

5. The hydrostatic assembly of claim 1 wherein:
    the pivot axis is a swashplate pivot axis;
    the common means for adjusting displacement is a common swashplate;
    the cylinder blocks and ports of the $1^{st}$ and $2^{nd}$ hydraulic drive units are mounted to the housing;
    the $2^{nd}$ means for adjusting displacement is a $2^{nd}$ swashplate mounted on the swashplate pivot axis adjacent the common swashplate;
    the cylinder block and ports of the $3^{rd}$ hydraulic drive unit are mounted to the housing;
    the housing comprises the least one fluid passage connecting the ports of the cylinder blocks in the $1^{st}$ and $2^{nd}$ hydraulic drive units to the ports of the cylinder block in the $3^{rd}$ hydraulic drive unit.

6. The hydrostatic assembly of claim 5 wherein the $1^{st}$, $2^{nd}$ and $3^{rd}$ hydraulic piston drive units are axial piston drive units.

7. The hydrostatic assembly of claim 6 wherein the $1^{st}$, $2^{nd}$, and $3^{rd}$ axial piston drive units are essentially the same.

8. The hydrostatic assembly of claim 1 wherein the drive shafts of the $1^{st}$ and $2^{nd}$ hydraulic piston drive units are essentially parallel.

9. The hydrostatic assembly of claim 8 wherein the cylinder blocks of the $1^{st}$ and $2^{nd}$ hydraulic piston drive units are coupled together at the same angle with respect to their drive shafts.

10. The hydrostatic assembly of claim 8 wherein the drive shaft of the $3^{rd}$ hydraulic piston drive unit is essentially parallel to the drive shafts of the $1^{st}$ and $2^{nd}$ hydraulic piston drive units.

11. The hydrostatic assembly of claim 1 wherein the $1^{st}$ and $2^{nd}$ hydraulic piston drive units act as a motor and the $3^{rd}$ hydraulic piston drive unit acts as a pump.

12. The hydrostatic assembly of claim 1 wherein the drive shafts of the $1^{st}$ and $2^{nd}$ hydraulic piston drive units are coupled to drive at the same speed.

13. The hydrostatic assembly of claim 12 wherein the drive shafts are coupled such that the $1^{st}$ hydraulic piston drive unit is rotationally offset with respect to the $2^{nd}$ hydraulic piston drive unit.

14. The hydrostatic assembly of claim 13 wherein the drive shafts are coupled such that the $1^{st}$ hydraulic piston drive unit is rotationally offset at half the angle between two rotationally adjacent cylinders.

15. The hydrostatic assembly of claim 12 wherein the $1^{st}$ and $2^{nd}$ hydraulic piston drive units each comprise a plurality of ports and pistons.

16. The hydrostatic assembly of claim 14 wherein the $1^{st}$ and $2^{nd}$ hydraulic piston drive units each comprise nine pistons and the $1^{st}$ hydraulic piston drive unit is rotationally offset 20 degrees between two rotationally adjacent cylinders.

17. The hydrostatic assembly of claim 12 wherein the drive shafts of the $1^{st}$ and $2^{nd}$ hydraulic piston drive units are coupled using sprockets and a chain or using engaged gears.

18. The hydrostatic assembly of claim 1 comprising a $4^{th}$ fourth hydraulic piston drive unit comprising a cylinder block with ports, pistons within the cylinders in the cylinder block, and a drive shaft mounted to the housing, wherein the drive shafts of $3^{rd}$ and $4^{th}$ hydraulic piston drive units are coupled together.

19. A controllable hydrostatic assembly comprising the assembly of claim 1, a single servo assembly to control the angle of the displacement adjusting common means on the pivot axis, and a single servo assembly to control the angle of the $2^{nd}$ displacement adjusting means on the pivot axis.

20. A method of increasing an output associated with a $1^{st}$ hydraulic piston drive unit in a hydrostatic assembly without using additional servo assemblies, the hydrostatic assembly comprising:
- a housing;
- a pivot axis;
- the $1^{st}$ hydraulic piston drive unit comprising:
  - a cylinder block with ports,
  - pistons within the cylinders in the cylinder block, and
  - a drive shaft mounted to the housing;
- common means for adjusting displacement of the $1^{st}$ hydraulic piston drive unit, the common means mounted on the pivot axis and capable of rotation;
- a $3^{rd}$ hydraulic piston drive unit comprising:
  - a cylinder block with ports,
  - pistons within the cylinders in the cylinder block, and
  - a drive shaft mounted to the housing;
- $2^{nd}$ means for adjusting displacement of the $3^{rd}$ hydraulic piston drive unit, the $2^{nd}$ means mounted on the pivot axis and capable of rotation independently of the common means;
- at least one fluid passage connecting the ports of the cylinder block in the $1^{st}$ hydraulic drive unit to the ports of the cylinder block in the $3^{rd}$ hydraulic drive unit, the method comprising:
- providing a $2^{nd}$ hydraulic piston drive unit comprising:
  - a cylinder block with ports,
  - pistons within the cylinders in the cylinder block, and
  - a drive shaft mounted to the housing;
- coupling the drive shaft of the $2^{nd}$ hydraulic piston drive unit to the drive shaft of the $1^{st}$ hydraulic piston drive unit; and
- employing the common means to simultaneously adjust displacement of the $1^{st}$ and $2^{nd}$ hydraulic piston drive units.

21. A method of reducing the amplitude of pressure pulsations associated with increasing the output from a $1^{st}$ hydraulic piston drive unit in a hydrostatic assembly comprising:
- increasing the output from the $1^{st}$ hydraulic drive unit according to the method of claim 19; and
- coupling the drive shafts of the $1^{st}$ and $2^{nd}$ hydraulic piston drive units such that the $1^{st}$ hydraulic piston drive unit is rotationally offset with respect to the $2^{nd}$ hydraulic piston drive.

* * * * *